United States Patent
Suzuki

[19]

[11] Patent Number: 6,161,473
[45] Date of Patent: Dec. 19, 2000

[54] RICE WASHING APPARATUS

[76] Inventor: Kisaku Suzuki, 2-Chome 3-15, Shinjuku-ku, Tokyo, Japan

[21] Appl. No.: 09/556,686

[22] Filed: Apr. 21, 2000

[30] Foreign Application Priority Data

Mar. 9, 2000 [JP] Japan ............................ 2000-064395

[51] Int. Cl.[7] ......................... A47J 43/24; A01N 37/18; B02B 1/04; A23L 1/00
[52] U.S. Cl. ............................... 99/516; 99/495; 99/472; 99/536; 134/132; 134/162; 134/198; 366/102; 366/279
[58] Field of Search ............................. 99/495, 516, 519, 99/534–536, 600, 609, 511, 472; 134/65, 132, 149, 153, 155, 157, 162, 198, 113, 117, 201; 366/169.1, 167.1, 168.1, 234, 250, 279, 101–107; 426/507, 519

[56] References Cited

U.S. PATENT DOCUMENTS

| | | | |
|---|---|---|---|
| 3,791,630 | 2/1974 | Hinds, Jr. | 99/455 X |
| 3,938,534 | 2/1976 | Akizawa | 134/133 X |
| 4,184,775 | 1/1980 | Akizawa | 99/536 X |
| 4,548,221 | 10/1985 | Abrams | 99/536 X |
| 4,756,323 | 7/1988 | Horton | 134/113 |
| 5,044,387 | 9/1991 | Hsu | 210/244 X |
| 5,119,721 | 6/1992 | Satake et al. | 99/536 X |
| 5,184,544 | 2/1993 | Ling | 99/536 |
| 5,512,310 | 4/1996 | Graef | 99/536 X |
| 5,586,492 | 12/1996 | Graef | 99/516 X |
| 5,778,769 | 7/1998 | Dodson | 99/536 |

*Primary Examiner*—Timothy F. Simone
*Attorney, Agent, or Firm*—Lowe Hauptman Gopstein Gilman & Berner

[57] ABSTRACT

A rice washing apparatus which can wash rice in a short time with a high degree of efficiency, and which can prevent occurrence of fragmentation of the rice, is composed of a rice washing tank formed of a cylindrical body, having a lower part in an inverted conical shape, and formed in its lower end with a rice discharge port, a water discharge pipe connected to a side of the lower part of the rice washing tank, a hollow valve rod adapted to be moved up and down in the rice washing tank, and provided in the lower part thereof with a rice discharge valve for opening and closing the rice discharge port, a hollow rotary shaft through which the valve rod is extended, and an agitating member 10 mounted to the rotary shaft. Water is fed into the valve rod through the upper part of the latter and flows down therein so as to suck air thereinto through air intake ports formed in the rotary shaft and the valve rod, and accordingly, the air and the water are mixed so as to produce bubbles which are then discharged into the lower part of the rice washing tank. Thus, the rice is washed by the water and the bubbles so as to enhance the effect of polishing of the rice, and to allow impurities such as rice bran to overflow from the rice washing tank with the use of the quality of the floatation of the impurities.

4 Claims, 4 Drawing Sheets

RICE WASHING APPARATUS

BACKGROUND OF THE INVENTION

The present invention relates to a rice washing apparatus used in a rice cooking machine in business use or the like Heretofore, there has been well-known, as is disclosed in Japanese Patent No. 2609821, a rice washing apparatus which is composed of a rice washing tank formed of a cylindrical body having a lower part in an inverted conical shape, and formed at its lower end with a rice discharge port, a hollow valve rod adapted to be moved up and down in the rice washing tank and having a lower part incorporating a rice discharge valve for opening and closing the rice discharge port, and an agitating member provided to a hollow rotary shaft received therethrough with the valve rod.

However, the above-mentioned rice washing apparatus washes rice with the use of only water while agitates the rice by means of the agitating member with no impingement among grains in rice, and accordingly, the effect of polishing of the rice is low, and further, since the rice is discharged from the rice discharge port in the lower part of the rice washing tank in the conventional rice washing machine, impurities such as rice bran cannot be smoothly discharged even though the rice brain having a low specific weight inherently floats. Thus, the washing of the rice is time-consuming, thereby there has been raised a problem such that it is likely to occur fragmentation of rice.

BRIEF SUMMARY OF THE INVENTION

The present invention has been devised in view of the problems inherent to the above-mentioned conventional apparatus, and accordingly, one object of the present invention is to provide a rice washing apparatus in which bubbles obtained by mixing water with air are discharged into the lower part of a rice washing tank so that the motion of the rice and the impingement among grains in the rice are intensified by the water and the bubbles while impurities including rice bran are allowed to overflow the washing tank with the use of the quality of the impurities which can float up in the water, so as to improve the efficiency of polishing of rice and to surely and easily discharge the impurities including rice bran, thereby it is possible to surely wash rice in a short time and to prevent occurrence of fragmentation of rice.

To the end, according to a first aspect of the present invention, there is provided a rice washing apparatus including a washing tank formed in its lower end with a rice discharge port and provided at a side of its lower part with a discharge pipe, a hollow valve rod adapted be vertically moved in the washing tank, and provided in its lower part with a discharge valve for opening and closing the rice discharge port, a hollow rotary shaft through which the valve rod is extended, an agitating member provided to the rotary shaft, a water feed pipe connected to the upper part of the hollow valve rod, for feeding water into the hollow valve rod so that the water flows downward in the valve rod while negative pressure is effected in the hollow valve rod, the hollow rotary shaft and the hollow valve rod being formed therein with air intake ports through which air is introduced into the hollow valve rod under the negative pressure, and further the hollow valve rod being provided in its lower part with a nozzle for discharging bubbles produced by mixing the air with the water, into the lower part of the washing tank, the rice washing tank being connected at its upper end part with an overflow pipe through which impurities including rice bran are discharged together with bubbles after floating up during washing of the rice.

According to a second aspect of the present invention, there is provided a rice washing apparatus in which the rice washing tank is formed of a cylindrical body having a lower part formed in an inverted conical shape, a cover is provided for covering the top part of the washing tank, and is mounted thereto with a spray nozzle for supplying the water into the washing tank and a rice storage tank provided in its lower part with a metering drum for feeding a predetermined quantity of the rice into the rice washing tank.

According to a third aspect of the present invention, there is provided a rice washing apparatus in which the hollow valve rod adapted to be vertically moved in the center part of the washing tank, has a small diameter part in the upper half thereof and a large diameter part in the lower half thereof, the air intake port is formed in the upper part of the large diameter part so as to be opposed to the air intake port formed in the hollow rotary shaft surrounding the valve rod, in order to increase the negative pressure in the large diameter part so as to increase the volume of air introduced thereinto.

According to a fourth aspect of the present invention, the hollow rotary shaft surrounding the valve rod located in the center part of the washing tank, is provided at its lower part with the agitating member which is composed of a plurality of agitating rods radially fixed to the rotary shaft at predetermined circumferential intervals.

In view of the above-mentioned arrangements, according to the present invention, when water is sprayed into the rice washing tank charged therein with a predetermined quantity of rice, from the top part of the latter, the agitating member is rotated through the rotary shaft, and therefore the rice and the water are agitated. At this time, water is fed into the valve rod through the water feed pipe, the water flowing down so as to effect negative pressure in the valve rod, and accordingly, air is introduced into the valve rod through the air intake ports which are formed in the rotary shaft and the valve rod so as to be communicated with each other, and is mixed with the water in order to produce bubbles which are discharge into the lower part of the washing tank from the bubble discharge nozzles in the lower part of the valve rod, and which then ascend.

Accordingly, the motion of the rice is quickly carried out in the all zones in the washing tank due to synergistic effect between the agitation by the agitating member and washing of the rice by the water and the bubbles, and accordingly, the impingement among grains in the rice is intensified so as to enhance the effect of washing of the rice. Further, since rice bran, dust and the like which float up in the rice washing tank during washing of the rice, are allowed to overflow through the overflow pipe from the upper part of the washing tank, impurities such as rice bran can be easily and surely discharged from the rice washing tank, thereby it is possible to wash the rice in a short time and to prevent occurrence of fragmentation of the rice.

The present invention will be detained in the form of an embodiment with reference to the accompanying drawings in which:

DETAILED DESCRIPTION OF THE INVENTION

As shown in FIGS. 1 to 4, a washing tank 2 fixed to a frame 1, is formed of a cylindrical body having a lower part in an inverted conical shape, and is formed in its lower end with a rice discharge port 3.

Figure 1:
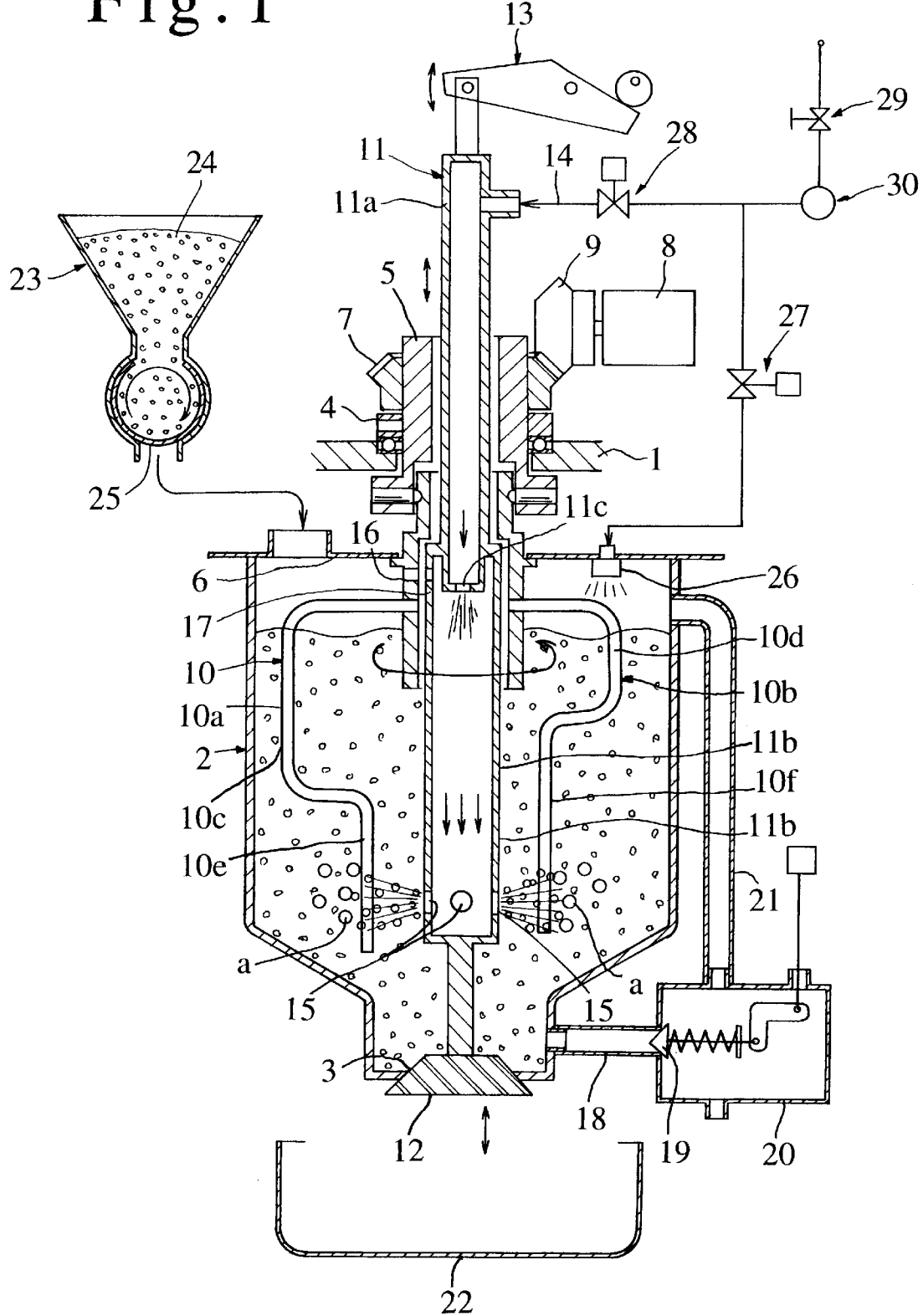
FIG. 1 is a vertically sectional view illustrating a rice washing apparatus in an embodiment of the present invention, in a condition in which rice is washed.
Figure 2:
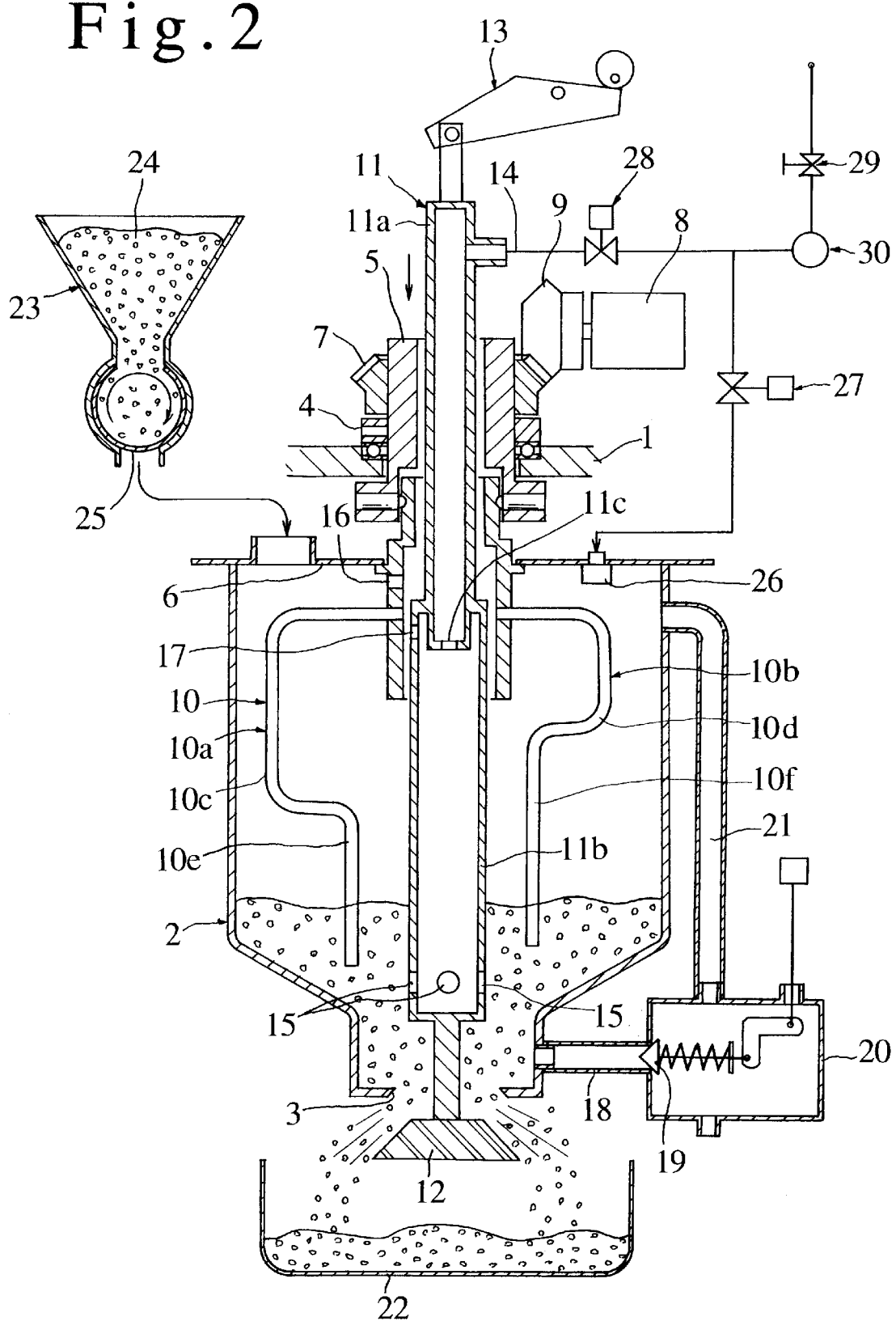
FIG. 2 is a vertically sectional view illustrating the rice washing apparatus shown in FIG. 1, in a condition in which the rice is discharged.
Figure 3:
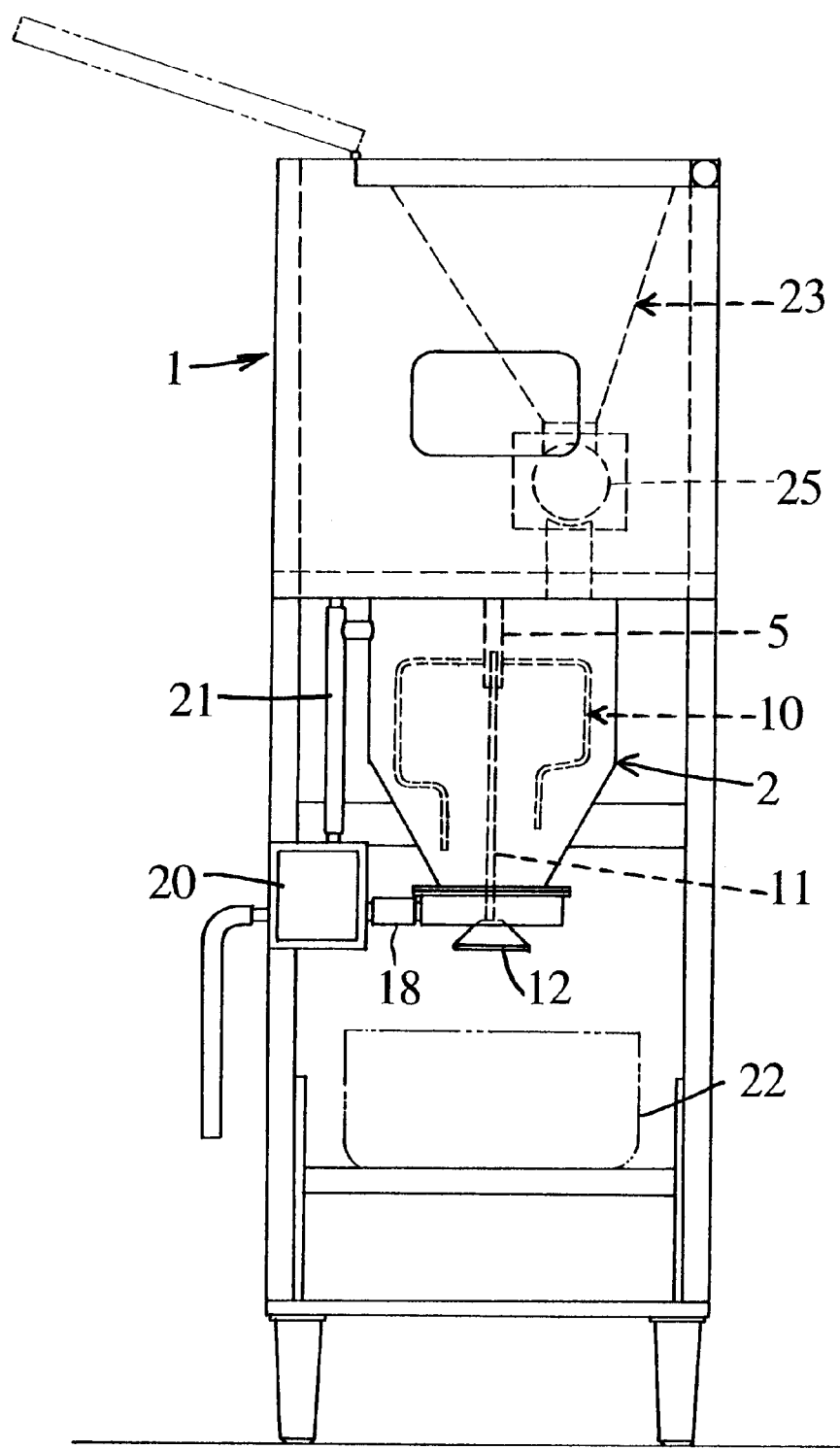
FIG. 3 is a front view illustrating the rice washing apparatus shown in FIG. 1.
Figure 4:
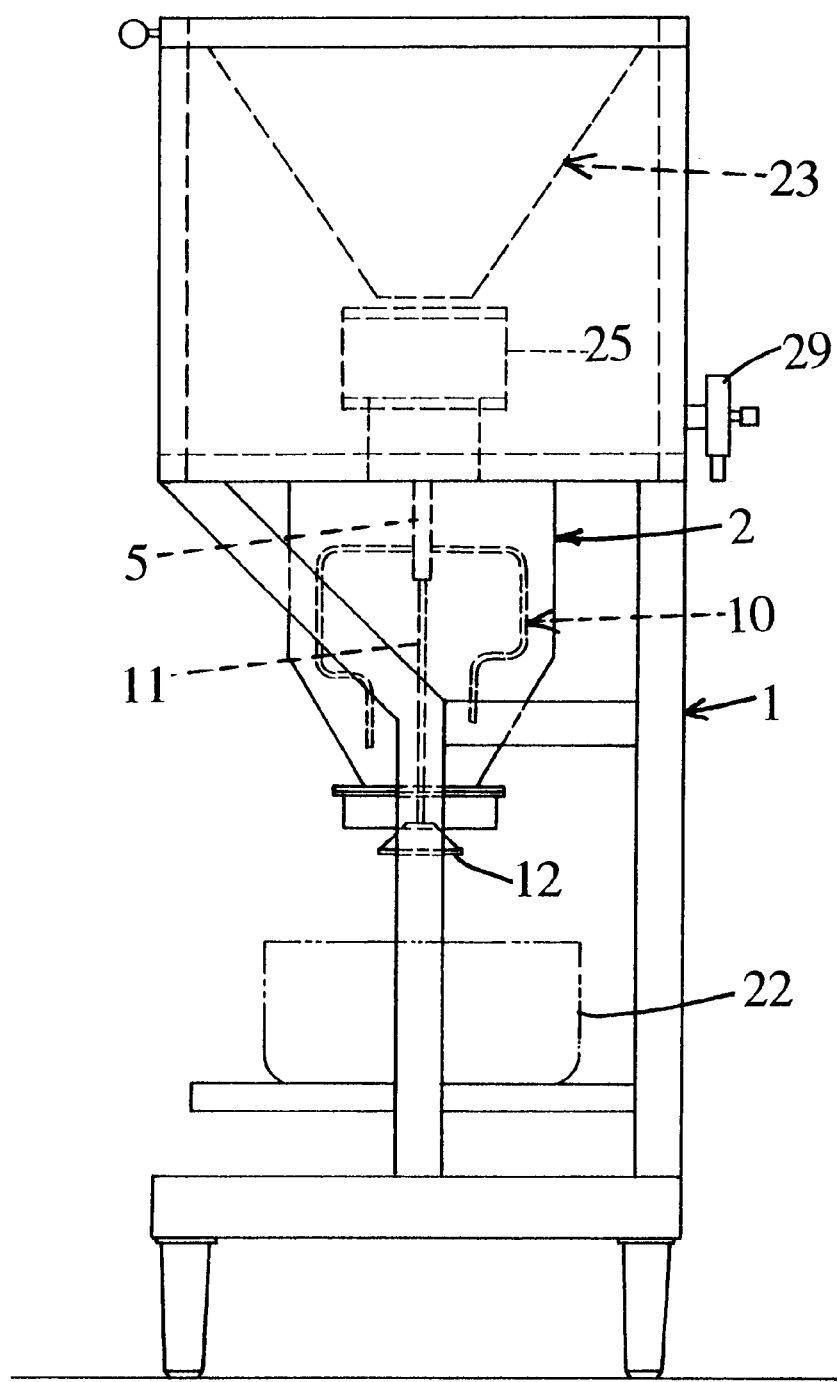
FIG. 4 is a side view illustrating the rice washing apparatus shown in FIG. 1.

As shown in FIGS. 1 and 2, a hollow rotary shaft 5 fixed, in a vertical posture, to the frame 4 through the intermediary of bearings 4, is extended through a cover 6 provided in the upper part of the rice washing tank 2, and is arranged in the upper part of the rice washing tank 2 at the center of the latter. The upper part of the rotary shaft 5 is fitted in and fixed to a gear 7 which is meshed with a gear 9 rotated by a motor 9, and accordingly, the rotary shaft 5 can be rotated by the motor 6.

An agitating member 10 is fixed to the lower part of the hollow rotary shaft 5 at a position in the upper part of the rice washing tank 2.

The agitating member 10 is formed as explained below:

Referring to FIGS. 1 and 2, a plurality of agitating rods 10a. . . , 10b. . . are radially fixed to the rotary shaft 5 at predetermined circumferential intervals. Each of the agitating rods 10a is composed of a large size U-like part 10c extending by a long length in the vertical direction in a U-like shape in a front view, and a short vertical part 10e extending downward from the large size U-like part 10c Meanwhile each of the agitating rods 10b is composed of a small size U-like part 10d extending by a short length in the vertical direction in a U-like shape in front view, and a long vertical part 10f extending downward from the small-size U-like shape.

The above-mentioned hollow rotary shaft 5 is inserted therethrough with a hollow valve rod 11 which is therefore vertically movable, and which is provided at its lower end with a rice discharge valve 12 for opening and closing the above-mentioned rice discharge port 3.

This valve rod 11, as shown in FIGS. 1 and 2, is vertically displaced by a predetermined stroke by a vertical drive mechanism 13 such as a cam mechanism or a crank mechanism, which is associated with and coupled to the upper end of the valve rod 11. Accordingly, the rice discharge port 3 in the lower end of the rice washing tank 2 can be opened and closed by the rice discharge valve 12.

The valve rod 11, as shown in FIGS. 1 and 2, is closed at its upper and lower end, and is connected, at a side in the upper part thereof, with a water feed pipe 14. Further, it is formed in the outer periphery of the lower part thereof with a plurality of bubble discharge nozzles 15 . . . , which are opened at predetermined circumferential intervals.

Further, air-intake ports 16, 17 are formed in the hollow rotary shaft 5 and the hollow rotary valve rod 11, respectively, being communicated with each other, in the upper part of the rice washing tank 2. When water fed into the valve rod 11 through the water feed pipe 14, flows down, negative pressure is effected in the valve rod 11, and accordingly, air is introduced into the valve rod 11 through the air intake ports 16, 17. Thus, bubbles a are produced after the air and the water are mixed with each other, and the bubbles a are discharged into the lower part of the rice washing tank 2 from the bubble discharge nozzles 15, 15 . . . in the lower part of the valve rod 11.

As shown in FIGS. 1 and 2, the above-mentioned rod 11 is composed of an upper half part or a small diameter par 11a, and a lower half part or a large diameter part 11b, and the above-mentioned air intake port 17 is formed in the large diameter part 11b, being opposed to the air intake port 16 in the rotary shaft 5. Accordingly, the water rapidly flows through a small water feed port 11c in the lower end of the small diameter part 11a and into the large diameter part 11b therebelow, and accordingly, the negative pressure in the large diameter part 11b is enhances so that a larger volume of air can be introduced, resulting in an increase in the volume of bubbles produced by mixing of the air and the water.

Further, as shown in FIGS. 1 and 2, a water discharge pipe 18 for discharging the water from the rice washing tank 2 after washing of the rice is connected to a side of the lower part of the rice washing tank 2, and a water discharge valve 19 for opening and closing the water discharge pipe 18 is provided in a water discharge box 20.

Further, an overflow pipe 21 is connected at its upper end with a side of the upper part of the rice washing tank 2, as shown in FIGS. 1 and 2, and at its lower end with the water discharge box 20. With this arrangement, impurities such as rice bran or dust float up together with the bubbles a in the rice washing tank 2 can overflow through the overflow pipe 21 and is then discharge into the water discharge box 20.

Referring to FIGS. 1 to 4, there are shown a pot 22 in the rice cooking machine, and a rice storage tank 23. The rice 24 in the rice storage tank 23 is discharged, a predetermined quantity by a predetermined quantity, by rotating a metering drum 25, and is then introduced into the rice washing tank 2.

Referring to FIGS. 1 and 2, there are shown a spray nozzle 26 for feeding the water in the form of a spray into the upper part of the rice washing tank 2, solenoid valves 27, 28, a water shut-off valve and a flowmeter 20.

With the arrangement of the present invention, as mentioned above, due to the agitation of water and rice by the agitating member, and due to the effect by the water and the bubbles, the rice is strongly stirred so as to intensify the impingement among grains of the rice, and accordingly, the effect of polishing (or washing) of the rice can be enhanced while impurities such as rice bran can be surely and easily discharged, overflowing, with the use of the quality of floatation thereof in the water, thereby it is possible to enhance the effect of washing of the rice, and to shorten the washing time. As a result, it is possible to prevent occurrence of fragmentation of rice due to excessive washing of the rice.

I claim:

1. A rice washing apparatus including a washing tank formed in its lower end with a rice discharge port and provided at a side of its lower part with a discharge pipe, a hollow valve rod adapted to be vertically moved in the washing tank, and provided in its lower part with a discharge valve for opening and closing the rice discharge port, a hollow rotary shaft through which the valve rod is extended, an agitating member provided to the rotary shaft, a water feed pipe connected to the upper part of the hollow valve rod, for feeding water into the hollow valve rod so that the water flows downward in the valve rod while negative pressure is effected in the hollow valve rod, the hollow rotary shaft and the hollow valve rod being formed therein with air intake ports through which air is introduced into the hollow valve rod under the negative pressure, and further the hollow valve rod being provided in its lower part with a nozzle for discharging bubbles produced by mixing the air with the water, into the lower part of the washing tank, the rice washing tank being connected at its upper end part with an overflow pipe through which impurities including rice bran are discharged together with bubbles from the rice washing tank after floating up during washing of the rice.

2. A rice washing apparatus as set forth in claim 1, wherein the rice washing tank is formed of a cylindrical body having a lower part formed in an inverted conical shape, a cover is provided for covering the top part of the washing tank, and is mounted thereto with a spray nozzle for supplying the water into the washing tank and a rice storage tank is provided in its lower part with a metering drum for feeding a predetermined quantity of the rice into the rice washing tank.

3. A rice washing apparatus as set forth in claim 1, wherein the hollow valve rod adapted to be vertically moved in the center part of the washing tank, has a small diameter part in the upper half thereof and a large diameter part in the lower half thereof, the air intake port is formed in the upper part of the large diameter part so as to be opposed to the air intake port formed in the hollow rotary shaft surrounding the valve rod, in order to increase the negative pressure in the large diameter part so as to increase the volume of air introduced thereinto.

4. A rice washing apparatus as set forth in claim 1, wherein the hollow rotary shaft surrounding the valve rod located in the center part of the washing tank, is provided at its Lower part with the agitating member which is composed of a plurality of agitating rods radially fixed to the rotary shaft at predetermined circumferential intervals.

* * * * *